United States Patent
Wu et al.

(10) Patent No.: US 11,071,083 B2
(45) Date of Patent: *Jul. 20, 2021

(54) METHOD AND SYSTEM FOR ADJUSTING PACKET LENGTH AND MOBILE DEVICE USING THE METHOD

(71) Applicant: AMBIT MICROSYSTEMS (SHANGHAI) LTD., Shanghai (CN)

(72) Inventors: Pei-Lun Wu, Taoyuan (TW); Han-Tiet Goh, New Taipei (TW)

(73) Assignee: AMBIT MICROSYSTEMS (SHANGHAI) LTD., Shanghai (CN)

(*) Notice: Subject to any disclaimer, the term of this patent is extended or adjusted under 35 U.S.C. 154(b) by 26 days.

This patent is subject to a terminal disclaimer.

(21) Appl. No.: 16/656,201

(22) Filed: Oct. 17, 2019

(65) Prior Publication Data

US 2021/0120520 A1    Apr. 22, 2021

(51) Int. Cl.
| | |
|---|---|
| H04W 64/00 | (2009.01) |
| H04W 4/029 | (2018.01) |
| G01S 19/51 | (2010.01) |
| H04W 52/02 | (2009.01) |
| H04W 4/02 | (2018.01) |
| H04L 12/805 | (2013.01) |

(52) U.S. Cl.
CPC .......... *H04W 64/006* (2013.01); *G01S 19/51* (2013.01); *H04L 47/36* (2013.01); *H04W 4/023* (2013.01); *H04W 4/029* (2018.02); *H04W 52/0238* (2013.01)

(58) Field of Classification Search
CPC ... H04W 64/006; H04W 4/029; H04W 4/023; H04W 52/0238; H04L 47/36; G01S 19/51

USPC .......................................................... 370/311
See application file for complete search history.

(56) References Cited

U.S. PATENT DOCUMENTS

| | | | | |
|---|---|---|---|---|
| 8,233,915 | B2* | 7/2012 | Paulson | H04W 4/20 455/456.1 |
| 10,602,402 | B1* | 3/2020 | Wu | H04W 4/80 |
| 2008/0255758 | A1* | 10/2008 | Graham | G08G 1/20 701/469 |
| 2014/0062777 | A1* | 3/2014 | MacGougan | G01S 19/07 342/357.43 |
| 2014/0274163 | A1* | 9/2014 | Liu | H04W 4/026 455/456.6 |
| 2014/0310243 | A1* | 10/2014 | McGee | G06F 16/27 707/639 |

(Continued)

Primary Examiner — Mong-Thuy T Tran
(74) Attorney, Agent, or Firm — ScienBiziP, P.C.

(57) ABSTRACT

A method for adjusting packet length is disclosed. A first reference point currently closest to the mobile device is calculated. It is determined whether the mobile device has been updated a reference point from a server after activated. It is determined whether the cycle of updating position information has been expired if the mobile device has been updated a first reference point from the server after activated. If the cycle of updating position information has not been expired, a position as the mobile device initially enter a range of the previous reference point at an initial time and then moves to a range of the current reference point at the current time is calculated to estimate a future position of the mobile device. A future reference point of the mobile device is calculated according to the estimated future position and is updated to the mobile device and the server.

15 Claims, 8 Drawing Sheets

(56) References Cited

U.S. PATENT DOCUMENTS

| | | | | |
|---|---|---|---|---|
| 2018/0321387 A1* | 11/2018 | Takahashi | ............... | G01S 19/43 |
| 2018/0367947 A1* | 12/2018 | Kim | ..................... | H04W 4/021 |
| 2020/0195656 A1* | 6/2020 | Marsh | .................... | H04W 12/08 |
| 2020/0208992 A1* | 7/2020 | Fowe | ...................... | G01C 21/30 |
| 2020/0388134 A1* | 12/2020 | Maluf | ................ | G08B 21/0446 |
| 2021/0036803 A1* | 2/2021 | Wu | ....................... | H04W 4/029 |

\* cited by examiner

METHOD AND SYSTEM FOR ADJUSTING PACKET LENGTH AND MOBILE DEVICE USING THE METHOD

BACKGROUND

1. Technical Field

The disclosure relates to packet processing techniques, and more particularly to a method and system for adjusting packet length and a mobile device using the method.

2. Description of Related Art

Internet of Things (IoT) front-end products transmit packets via Long Range (LoRa) technology, which is a long range, low power wireless platform that has become the de facto technology for IoT networks worldwide. The LoRa technology has the following characteristics: even if the packet length is very slightly increased, the packet loss rate is significantly raised since the probability of packet collisions with other devices is increased. When the collision is detected, the packets may be lost or become incomplete that may be problematic to users in long-term user. Furthermore, overlong packet lengths and frequently uploading packets may result in a sharp raise of packet loss rate. Finally, most IoT front-end products are powered by batteries of low capacities without re-charging capability, hence, frequently replacing batteries are required.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

A global positioning system (GPS) packet is the packet with the longest length in a positioning system. Considering the packet loss rate and the power consumption of the positioning system, reducing the packet length is a top priority. Since cars, mobile devices or objects needed to be positioned usually move at a specific area, an embodiment of a method for adjusting packet length of the present disclosure divides the specific area into multiple sections and defines GPS reference points according to the sections. The GPS reference points and a selecting algorithm choosing the reference points are stored in a GPS device.

Figure 1A:
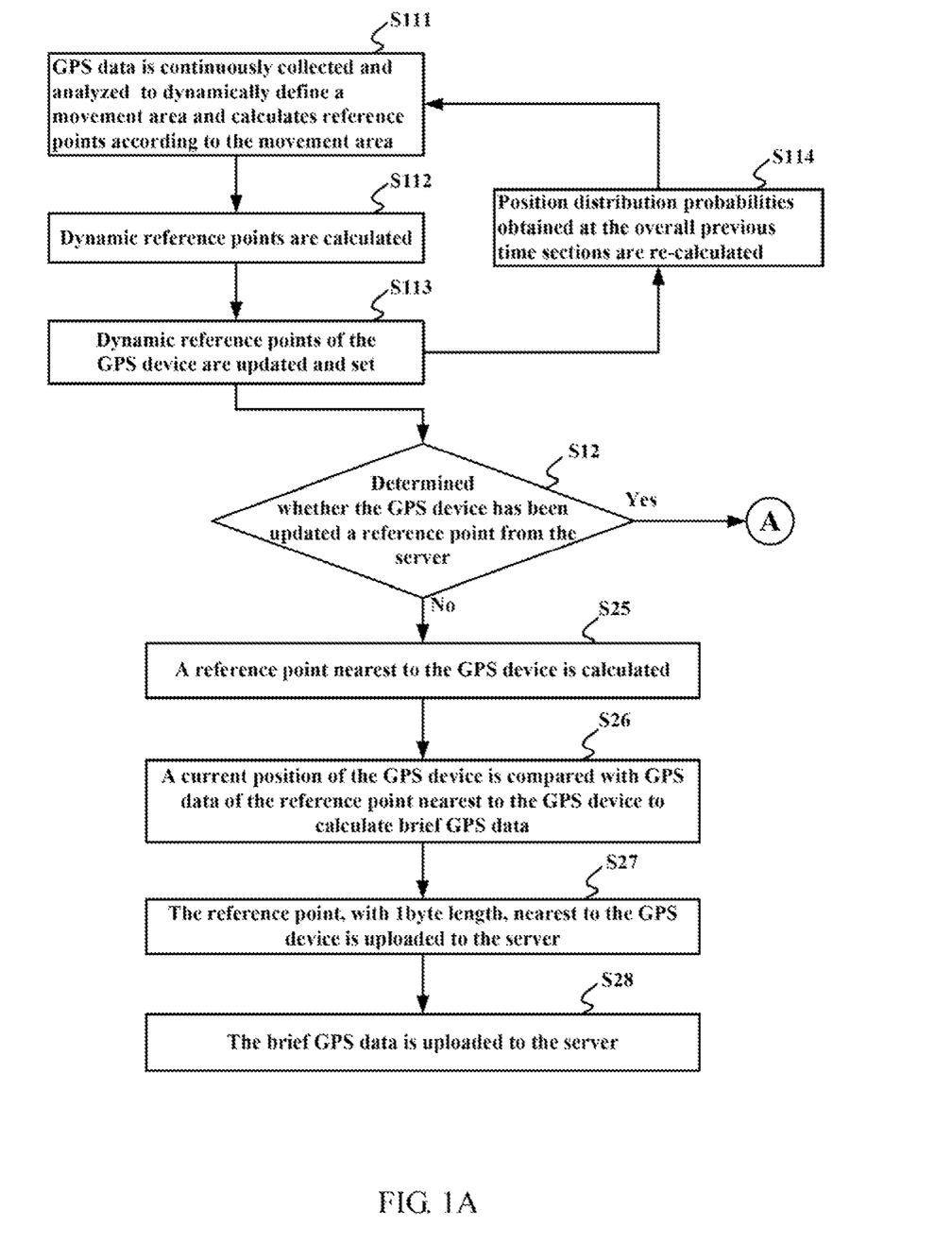
FIG. 1A and FIG. 1B are flowcharts of an embodiment of a method for adjusting packet length according to the present disclosure.
Figure 1B:
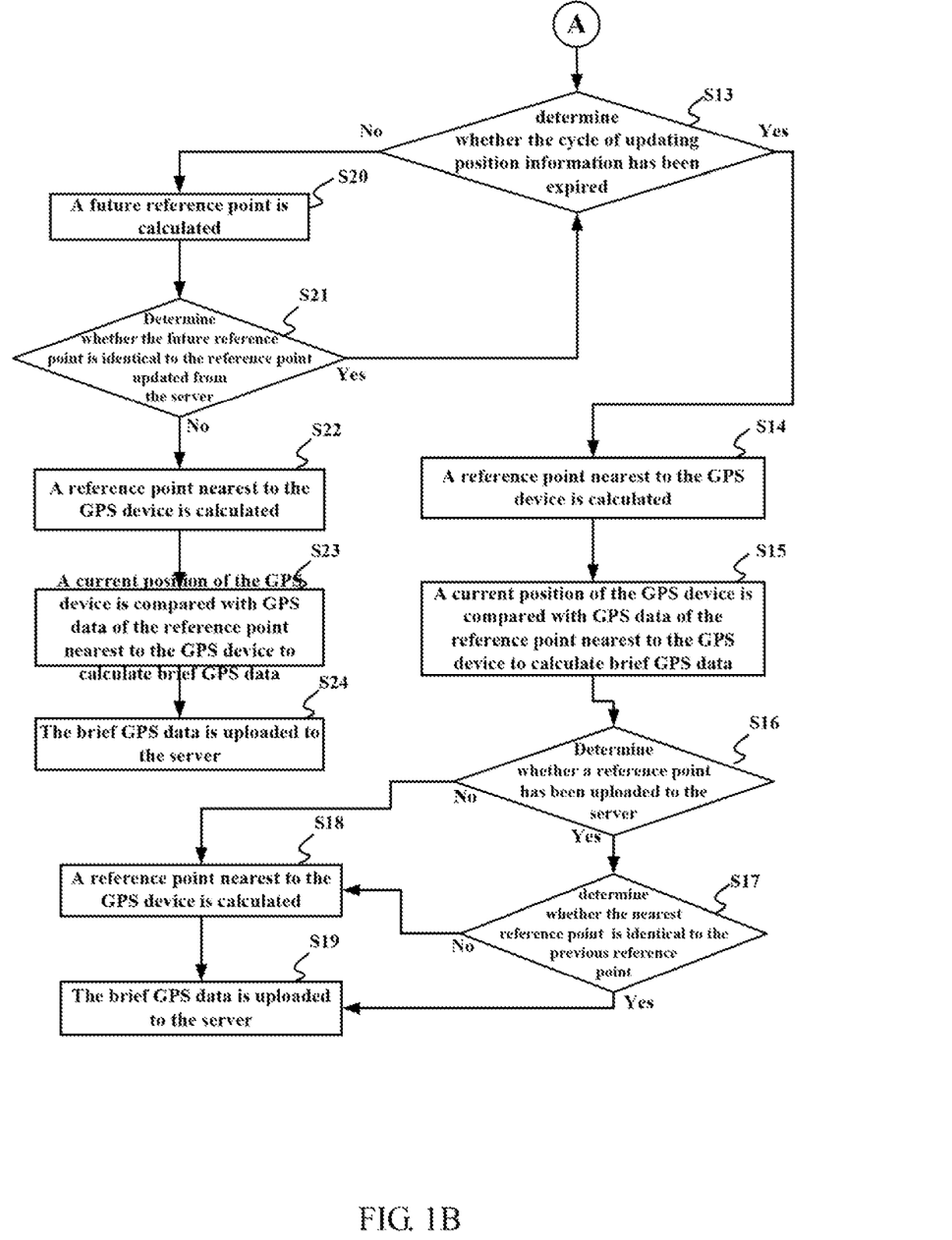

FIGS. 1A and 1B are flowcharts of an embodiment of a method for adjusting packet length of the present disclosure.

In Step S111, the server continuously collects GPS data uploaded by the GPS device compatible with the LoRa protocol and analyzes the GPS data to ally define a movement area of the GPS device so that the longitude and the latitude of the movement area are obtained. The longitude of the movement area is represented as $(Lon_L, Lon_H)$ while the latitude thereof is represented as $(Lat_L, Lat_H)$. Multiple reference points are defined according to the movement area of the GPS device and are written in the GPS device and the server connecting to the GPS device, as shown in FIG. 2.

Further, the movement area is divided into multiple sections and N reference points are defined according to the sections. The position of the n-th reference point is calculated using the formula (1), represented as:

$$\begin{cases} Lon_n = (n-1)(Lon_H - Lon_L)/\sqrt{N} \\ Lat_n = (n-1)(Lat_H - Lat_L)/\sqrt{N} \end{cases} \quad (1)$$

Figure 2:
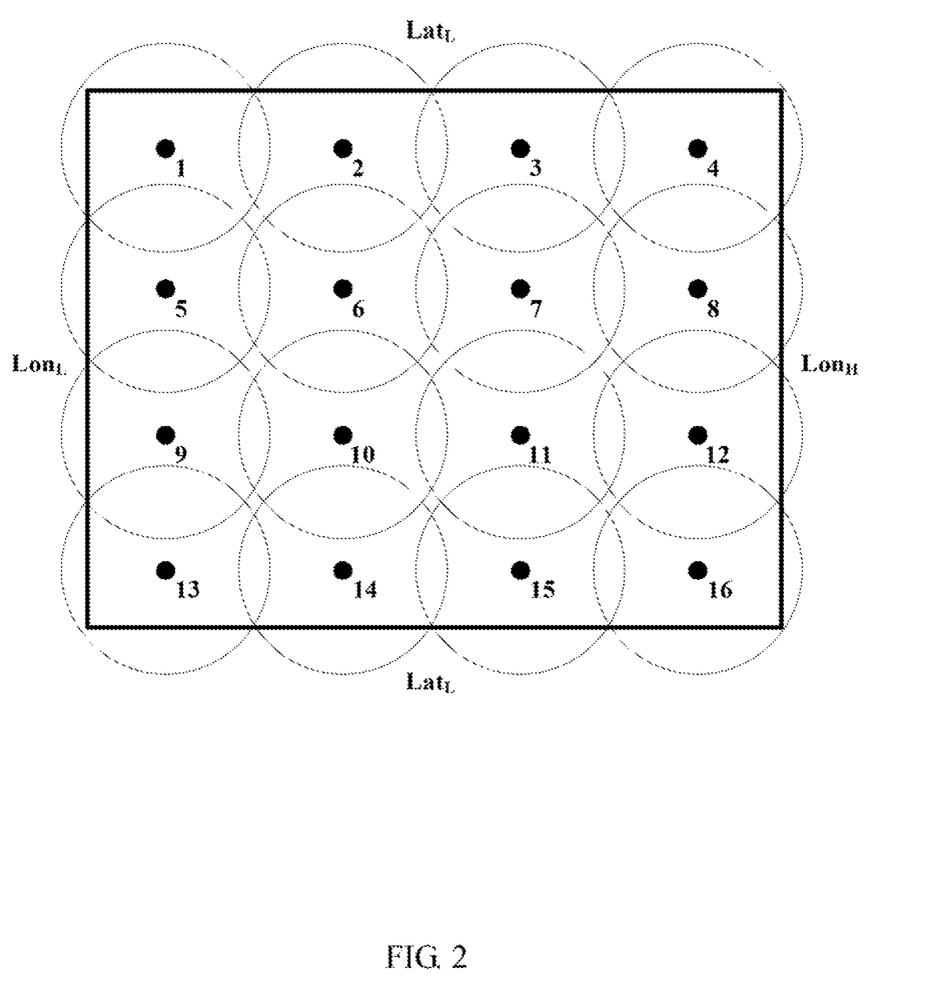
FIG. 2 is a schematic diagram of an embodiment of defining reference points according to the present disclosure.

Referring to FIG. 2, for example, the overall reference points are defined using the formula (1) to get 16 reference points (N=16).

In Step S112, the GPS data uploaded by the GPS device is analyzed by the server to obtain position distribution probabilities (DP) of each of the reference points, and selects reference points with the distribution probabilities greater than P ($S \in \{n_{DP} \geq P\}$) as reference points.

Figure 3:
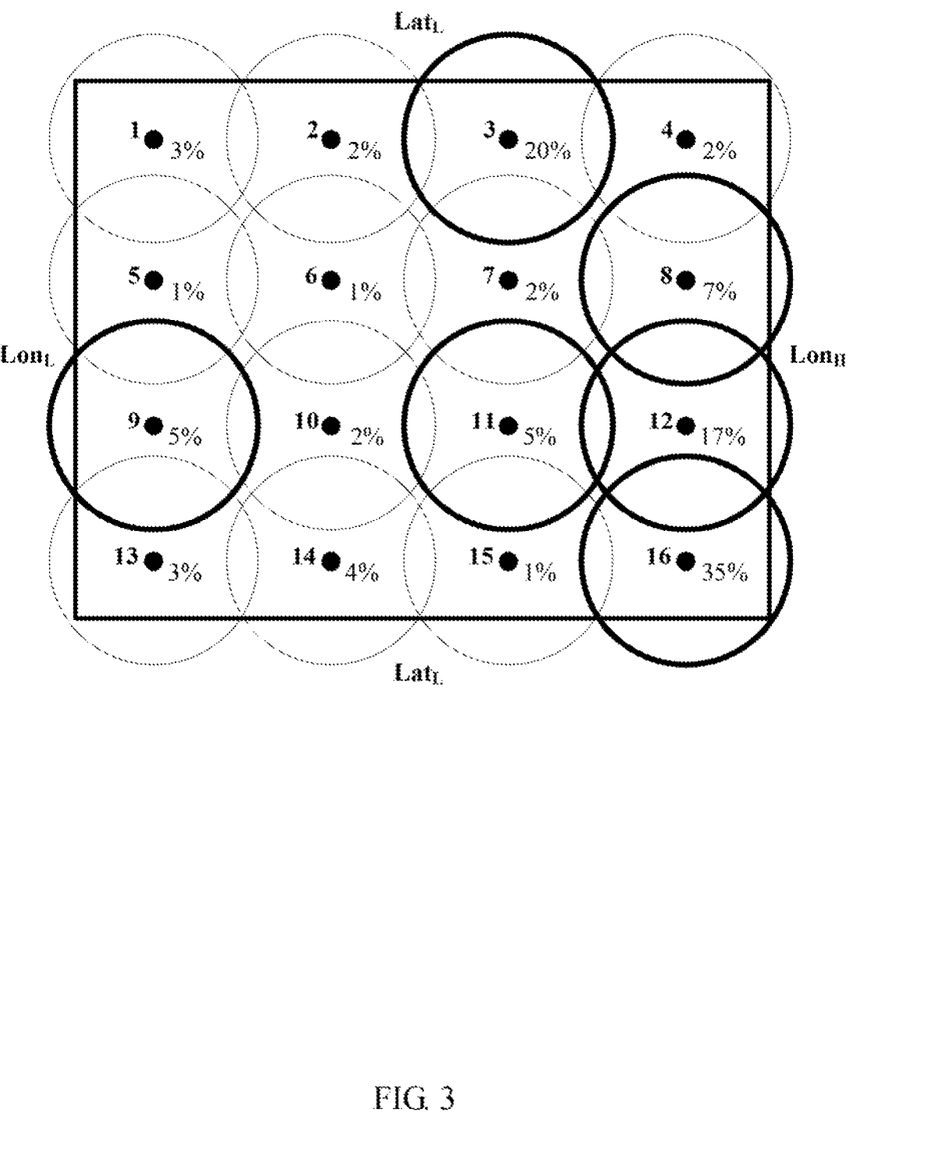
FIG. 3 is a schematic diagram of an embodiment of calculating reference points according to the present disclosure.

In an embodiment, the P is defined as 5%. The movement area of the GPS device is shown in FIG. 2. The server collects and analyzes position distribution probabilities of the reference points of the GPS device and selects and treats the reference points 3, 8, 9, 11, 12 and 16 as the reference points, as shown in FIG. 3.

In Step S113, the server updates and sets, via a LoRa downloading transmission method, the reference points of the GPS device.

In Step S114, as a period of time passed, when the server collects another W pieces of GPS data, the previous GPS data is re-checked that reference weights for the reference points are decreased. At the time point T, position distribution probabilities obtained at the overall previous time sections are re-calculated using the formula (2), as shown in the following:

$$S \in \left\{ \sum_{t=0}^{T} \left(\frac{M_t}{T}\right) n_{DP} \geq P \right\}. \quad (2)$$

As the GPS device continuously moves, the al reference points are capable of statistical features that raises the reliability.

In Step S12, it is determined whether the GPS device has been updated a reference point from the server after activated.

In Step S13, if the GPS device has been updated a reference point, a first reference point, for example, from the server after activated, it is determined whether the cycle of updating position information has been expired.

In Step S14, if the cycle of updating position information has been expired, a reference point is going to be selected, using formulas (3) and (4), and stored in the GPS device and the server connecting to the GPS device via a network. When the GPS device is activated, a reference point, for example, a second reference point, nearest to the GPS device is calculated and selected using the formulas (3) and (4), represented as:

$$n = \min_{1 \leq n \leq N} (|Lon_d - Lon_n|2 + |Lat_d - Lat_n|2); \text{ and} \quad (3)$$

$$\begin{cases} Lon_n = n(Lon_H - Lon_L)/\sqrt{N} \\ Lat_n = n(Lat_H - Lat_L)/\sqrt{N} \end{cases} \quad (4)$$

Referring to FIG. 3, for example, when the GPS device is located at the movement area, the GPS position thereof is substituted into the formulas (3) and (4) to obtain the 16-th reference point (n=16). The GPS device transmits the selected reference point and its current position to the server.

In step S15, a current position of the GPS device is compared with GPS data of the reference point nearest to the GPS device, for example, the second reference point, to calculate brief GPS data.

In step S16, it is determined whether a reference point, for example, a first reference point, has been uploaded to the server.

In step S17, it is determined whether the reference point nearest to the GPS device, for example, the second reference point, is identical to the first reference point if the first reference point has been uploaded to the server.

In step S18, the first reference point with 1 byte length is uploaded to the server using a LoRa uploading transmission method if the reference point nearest to the GPS device, for example, the second reference point, is not identical to the first reference point.

Referring to step S16, the reference point nearest to the GPS device, for example, the second reference point, is uploaded to the server if the first reference point has not been uploaded to the server.

In step S19, the brief GPS data is uploaded to the server using the LoRa uploading transmission method.

In step S18, the first reference point to the server is not uploaded if the reference point nearest to the GPS device, for example, the second reference point, is identical to the first reference point, and only the brief GPS data is uploaded to the server using the LoRa uploading transmission method.

The server confirms the current reference point of the mobile device using a downloading instruction.

The reference point previously uploaded is selected, if the mobile device is located near multiple reference points of the plurality of reference points with the same distance or a saved packet length for the calculated brief GPS data of each of the multiple reference points is identical to each other.

Referring to step S17, original GPS data of the GPS device is uploaded to the server if the GPS device moves cross the movement area.

In step S20, if the cycle of updating position information has not been expired, a future reference point is calculated. The GPS device calculates, using the formulas (5) and (6), a position as the GPS device initially enter a range of the previous reference point at an initial time and then moves to a range of the current reference point at the current time (according to the weight Mt), for example, the GPS device moves from the first reference point to second reference point, to estimate the future position of the GPS device. The formulas (5) and (6) are represented as follows:

$$Lon_d(T+1) = Lon_d(T) + \sum_{t=1}^{T} \left(\frac{2M_t}{T}[Lon_d(t) - Lon_d(t-1)]\right); \text{ and} \quad (5)$$

$$Lat_d(T+1) = Lat_d(T) + \sum_{t=1}^{T} \left(\frac{2M_t}{T}[Lat_d(t) - Lat_d(t-1)]\right). \quad (6)$$

The future reference point of the GPS device is calculated according to the estimated future position using a formula (7) represented as follows:

$$n_d(T+1) = \min_{n(T+1) \in S} (|Lon_d(T+1) - Lon_n|^2 + |Lat_d(T+1) - Lat_n|^2). \quad (7)$$

Figure 4:
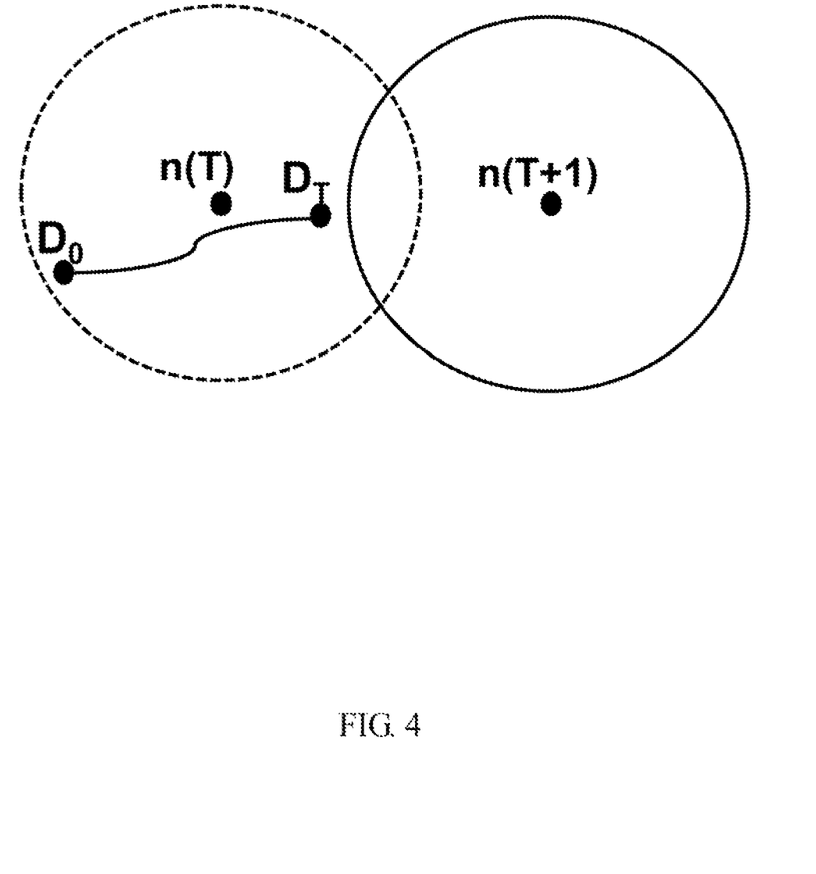
FIG. 4 is a schematic diagram of an embodiment of calculating future reference points according to the present disclosure.

When $n_d(T+1) - n(T) \neq 0$ is true, the GPS device updates a reference point n(T+1) from the server and takes the updated reference point as a new reference point, as shown in FIG. 4, Thus, the GPS device can transmits the brief GPS data when the time T+1 reaches or after the time T+1.

The GPS device is internally installed with a timer. The timer starts to count when the GPS device updates the future reference point from the server and, when the shortest update time of reference point estimation $T_U$ has been expired, re-updates another new reference point from the server. Defining the shortest update time of reference point estimation $T_U$ is to prevent the GPS device from moving between two reference points back and forth based on the common boundary of the two reference points, enabling the GPS device to frequently update reference points from the server.

In step S21, it is determined whether the future reference point is identical to the reference point updated from the server, for example, the first reference point, in step S12. If the future reference point is identical to the first reference point, the updating operation of the GPS device is ignored.

In step S22, if the future reference point is identical to the first reference point, a reference point nearest to the GPS device is calculated, for example, a third reference point, using the formulas (3) and (4).

In step S23, a current position of the GPS device is compared with GPS data of the reference point nearest to the GPS device to calculate brief GPS data.

In step S24, the reference point nearest to the GPS device and the brief GPS data are uploaded to the server using the LoRa uploading transmission method, In step S25, if the GPS device has not been updated a reference point, a first reference point, for example, from the server after activated, a reference point nearest to the GPS device, for example, a forth reference point, is calculated using the formulas (3) and (4), and the forth reference point is stored in the GPS device and the server connecting to the server.

In step S26, a current position of the GPS device is compared with GPS data of the reference point nearest to the GPS device to calculate brief GPS data.

In step S27, the reference point, with 1 byte length, nearest to the GPS device is uploaded to the server using the LoRa uploading transmission method.

In step S28, the brief GPS data is uploaded to the server using the LoRa uploading transmission method.

The following describes an embodiment of the technical effect of the brief GPS data.

Referring to FIG. 2, position addresses of the GPS device moving within the movement area are transformed using a NMEA (National Marine Electronics Association)-to-LoRa transformation formula to generate GPS data with the LoRa format, as shown in Table 1.

TABLE 1

|   | Lat    | Lon    |
|---|--------|--------|
| H | 2C26F3 | 56324B |
| L | 2C1B0E | 563D07 |

In the movement area, as shown in Table 1, the addresses the longitude and the latitude comprise the same addresses "2C" and "56", respectively using 1 byte, so that the addresses "2C" and "56" can be ignored. Thus, the GPS data saves at least 2 bytes, as shown in Table 2.

TABLE 2

|                  | Message Type | Longitude | Latitude | Total Length |
|------------------|--------------|-----------|----------|--------------|
| Original Method  | 1 byte       | 3 bytes   | 3 bytes  | 7 bytes      |
| Propose Method   | 1 byte       | 2 bytes   | 2 bytes  | 5 bytes      |

The following describes another embodiment of the technical effect of the brief GPS data.

Figure 5:
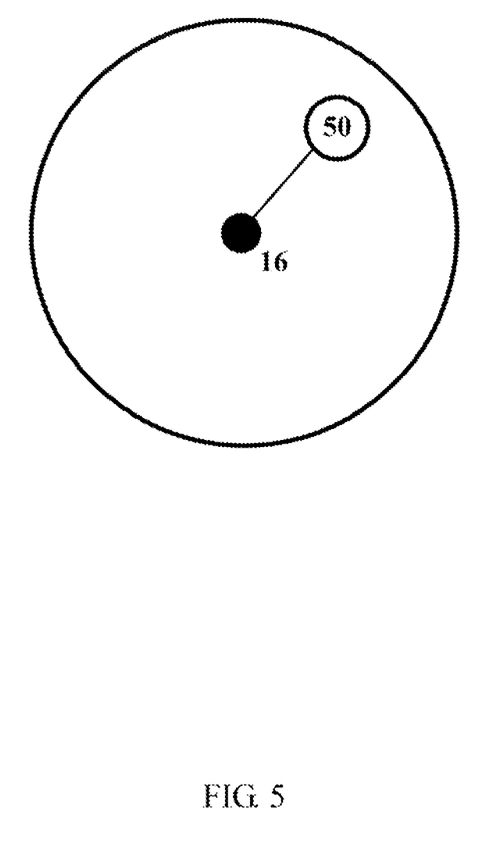
FIG. 5 is a schematic diagram of an embodiment of saving packet lengths according to the present disclosure.

Referring to FIG. 5 comprising the reference point 16 and the GPS device 50, position addresses of the GPS device moving within the movement area and the reference point 16 are transformed using the NMEA-to-LoRa transformation formula to generate GPS data with the LoRa format, as shown in Table 3.

TABLE 3

|                 | Lat    | Lon    |
|-----------------|--------|--------|
| Reference Point | 2C1C51 | 563C7F |
| DUT Location    | 2C1CE0 | 563CBA |

The GPS device 50 is quite close to reference point 16. In the movement area, as shown in Table 3, the addresses the longitude and the latitude comprise the same addresses "2C1C" and "563C", respectively using 2 byte, so that the addresses "2C1C" and "563C" can be ignored. Thus, the GPS data saves at least 4 bytes, as shown in Table 4.

TABLE 4

|                  | Message Type | Longitude | Latitude | Total Length |
|------------------|--------------|-----------|----------|--------------|
| Original Method  | 1 byte       | 3 bytes   | 3 bytes  | 7 bytes      |
| Propose Method   | 1 byte       | 1 byte    | 1 byte   | 3 bytes      |

Figure 6:
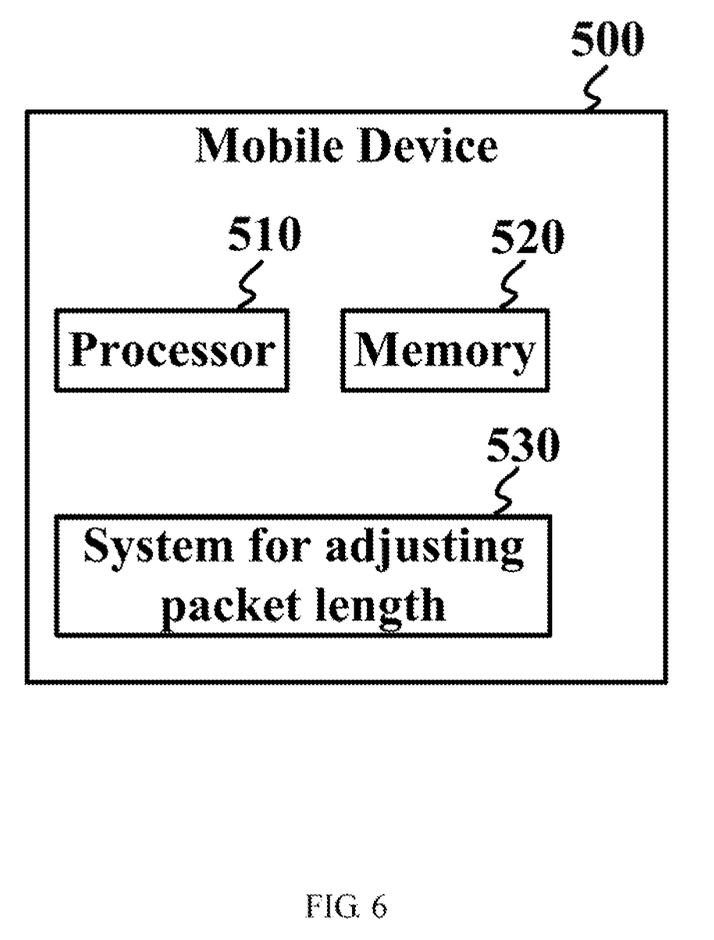
FIG. 6 is a schematic diagram of an embodiment of a hardware architecture of a mobile device according to the present disclosure.

FIG. 6 is a schematic diagram of an embodiment of the hardware architecture of a mobile device of the present disclosure. The mobile device 500 may, but is not limited to, connect to a processor 510, a memory 520 and a system for adjusting packet length 530 via system buses. The mobile device 500 shown in FIG. 6 may include more or less components than those illustrated, or may combine certain components.

The memory 520 stores a computer program, such as the system for adjusting packet length 530, which is executable by the processor 510. When the processor 510 executes the system for adjusting packet length 530, the blocks in one embodiment of the method for adjusting packet length applied in the mobile device 500 are implemented, such as blocks S41 to S42 shown in FIG. 4.

It will be understood by those skilled in the art that FIG. 5 is merely an example of the mobile device 500 and does not constitute a limitation to the mobile device 500. The mobile device 500 may include more or less components than those illustrated, or may combine certain components. The mobile device 500 may also include input and output devices, network access devices, buses, and the like.

The processor 510 may be a central processing unit (CPU), or may be other general-purpose processors, a digital signal processor (DSP), an application specific integrated circuit (ASIC), a Field-Programmable Gate Array (FPGA), or other programmable logic device, discrete gate or transistor logic device, discrete hardware components, or the like. The processor 510 may be a microprocessor or other processor known in the art.

The memory 520 can be used to store the system for adjusting packet length 530 and/or modules/units by running or executing computer programs and/or modules/units stored in the memory 520. The memory 520 may include a storage program area and a storage data area. In addition, the memory 520 may include a high-speed random access memory, a non-volatile memory such as a hard disk, a plug-in hard disk, a smart memory card (SMC), and a secure digital (SD) card, flash card, at least one disk storage device, flash device, or other volatile solid state storage device.

The system for adjusting packet length 530 can be partitioned into one or more modules/units that are stored in the memory 520 and executed by the processor 510. The one or more modules/units may be a series of computer program instructions capable of performing particular functions of the system for adjusting packet length 530.

Figure 7:
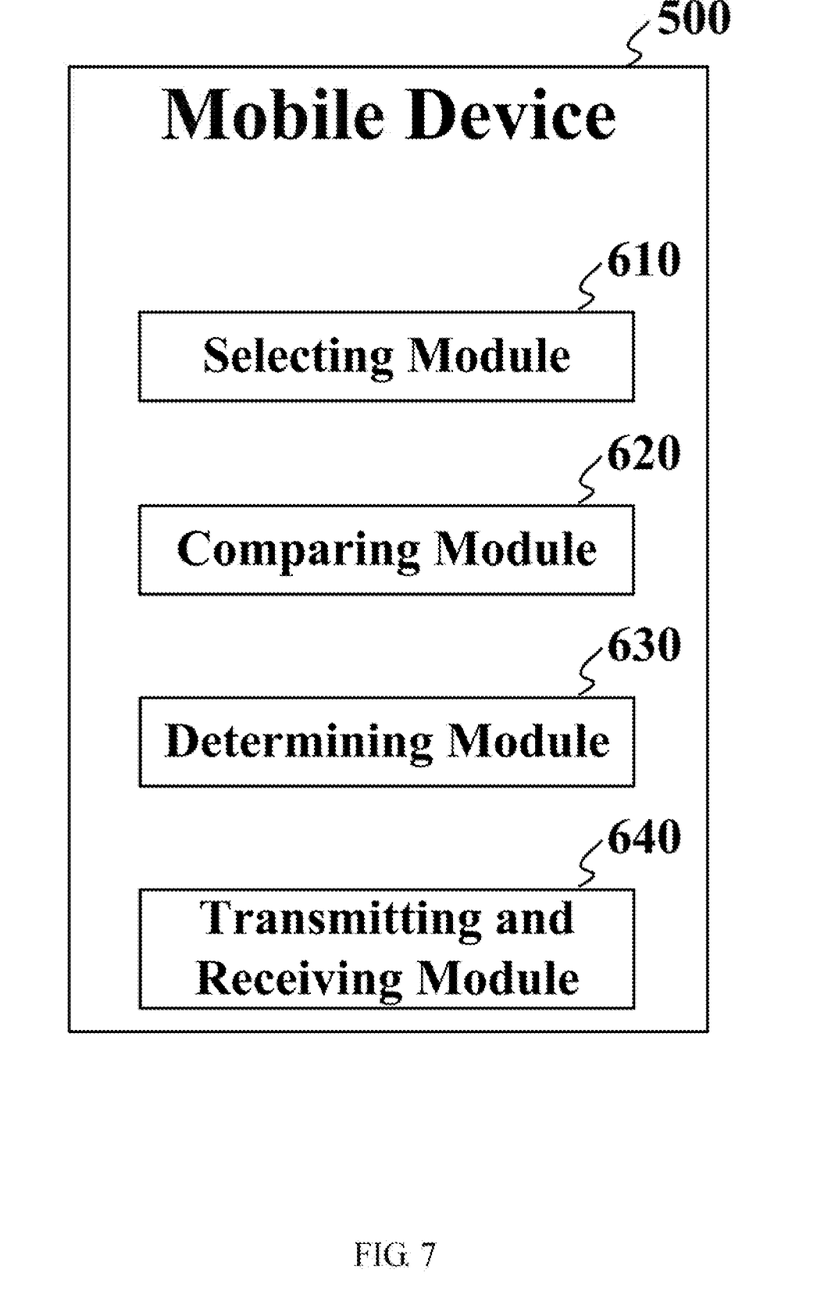
FIG. 7 is a schematic diagram of an embodiment of functional blocks of a system for adjusting packet length according to the present disclosure.

FIG. 7 is a schematic diagram of an embodiment of functional blocks of a system for adjusting packet length of the present disclosure.

The mobile devices 500 comprises a selecting module 610, a comparing module 620, a determining module 630 and a transmitting and receiving module 640.

The transmitting and receiving module 640 uploads GPS data of the Mobile device 500, compatible with the LoRa protocol, and reference points to a server (not shown). The server continuously collects GPS data uploaded by the Mobile device 500 and analyzes the GPS data to ally define a movement area of the Mobile device 500 so that the longitude and the latitude of the movement area are obtained. The longitude of the movement area is represented as ($Lon_L$, $Lon_H$) while the latitude thereof is represented as ($Lat_L$, $Lat_H$). Multiple reference points are defined according to the movement area of the Mobile device 500 and are written in the Mobile device 500 and the server connecting to the Mobile device 500, as shown in FIG. 2.

Further, the movement area is divided into multiple sections and N reference points are defined according to the sections. The position of the n-th reference point is calculated using the formula (1), represented as:

$$\begin{cases} Lon_n = (n-1)(Lon_H - Lon_L)/\sqrt{N} \\ Lat_n = (n-1)(Lat_H - Lat_L)/\sqrt{N} \end{cases} \quad (1)$$

Referring to FIG. 2, for example, the overall reference points are defined using the formula (1) to get 16 reference points (N=16).

Further, the transmitting and receiving module 640 receives the reference point information from the server and updates the information to the Mobile device 500.

The server collects and analyzes multiple pieces of GPS data of the Mobile device 500 to obtain position distribution probabilities (DP) of each of the reference points, and selects reference points with the distribution probabilities greater than P (S∈{$n_{DP}$≥P}).

In an embodiment, the P is defined as 5%. The movement area of the Mobile device 500 is shown in FIG. 2. The server collects and analyzes position distribution probabilities of the reference points of the Mobile device 500 and selects and treats the reference points 3, 8, 9, 11, 12 and 16 as reference points, as shown in FIG. 3. The server updates and sets, via the LoRa downloading transmission method, the reference points of the Mobile device 500.

As a period of time passed, when the server collects another W pieces of GPS data, the previous GPS data is re-checked that reference weights for the reference points are decreased. At the time point T, position distribution probabilities obtained at the overall previous time sections are re-calculated using the formula (2), as shown in the following:

$$S \in \left\{ \sum_{t=0}^{T} \left(\frac{Mt}{T}\right) n_{DP} \geq P \right\}. \quad (2)$$

As the Mobile device 500 continuously moves, the al reference points are capable of statistical features that raises the reliability.

The determining module 630 determines whether the mobile device 500 has been updated a reference point from the server after activated, and, if the mobile device 500 has been updated a reference point, a first reference point, for example, from the server after activated, determines whether the cycle of updating position information has been expired.

When the cycle of updating position information has been expired, the selecting module 610 calculates, from the multiple reference points, a reference point currently closest to the mobile device 500, for example, the second reference point, using the formulas (3) and (4), and, stores the second reference point in the mobile device 500 and the server connecting to the mobile device 500 via a network.

The selecting module 610 calculates the reference point currently closest to the mobile device 500 using the formulas (3) and (4), represented as:

$$n = \min_{1 \leq n \leq N} (|Lon_d - Lon_n|2 + |Lat_d - Lat_n|2), \text{ and} \quad (3)$$

$$\begin{cases} Lon_n = n(Lon_H - Lon_L)/\sqrt{N} \\ Lat_n = n(Lat_H - Lat_L)/\sqrt{N} \end{cases} \quad (4)$$

Referring to FIG. 3, for example, when the Mobile device 500 is located at the movement area, the GPS position thereof is substituted into the formulas (3) and (4) to obtain the 16-th reference point (n=16). The Mobile device 500 transmits the selected reference point and its current position to the server.

The comparing module 620 compares a current position of the mobile device 500 with GPS data of the second reference point to calculate brief GPS data.

The determining module 630 determines whether a reference point, for example, the first reference point, has been uploaded to the server, and determines whether the second reference point is identical to the first reference point if the first reference point has been uploaded to the server. The transmitting and receiving module 640 uploads the second reference point with 1 byte length to the server using the LoRa uploading transmission method if the second reference point is not identical to the first reference point, and uploads the second reference point to the server if the first reference point has not been uploaded to the server.

The transmitting and receiving module 640 then uploads the brief GPS data to the server using the LoRa uploading transmission method.

The transmitting module and receiving 640 does not upload the second reference point to the server if the second reference point is identical to the first reference point, and only uploads the brief GPS data to the server using the LoRa uploading transmission method.

The transmitting module and receiving 640 uploads the reference point previously selected, if the mobile device 500 is located near multiple reference points of the plurality of reference points with the same distance or a saved packet length for the calculated brief GPS data of each of the multiple reference points is identical to each other.

If the cycle of updating position information has not been expired, the selecting module 610 calculates a future reference point. The selecting module 610 calculates, using the formulas (5) and (6), a position as the mobile device 500 initially enter a range of the previous reference point at an initial time and then moves to a range of the current reference point at the current time (according to the weight Mt), for example, the mobile device 500 moves from the first reference point to second reference point, to estimate the future position of the mobile device 500. The formulas (5) and (6) are represented as follows:

$$Lon_d(T+1) = Lon_d(T) + \sum_{t=1}^{T}\left(\frac{2M_t}{T}[Lon_d(t) - Lon_d(t-1)]\right); \text{ and} \quad (5)$$

$$Lat_d(T+1) = Lat_d(T) + \sum_{t=1}^{T}\left(\frac{2M_t}{T}[Lat_d(t) - Lat_d(t-1)]\right). \quad (6)$$

The selecting module 610 calculates the future reference point of the mobile device 500 according to the estimated future position using a formula (7) represented as follows:

$$n_d(T+1) = \min_{n(T+1)\in S}(|Lon_d(T+1) - Lon_n|^2 + |Lat_d(T+1) - Lat_n|^2). \quad (7)$$

When $n_d(T+1)-n(T)\neq 0$ is true, the mobile device 500 updates a reference point n(T+1) from the server and takes the updated reference point as a new reference point, as shown in FIG. 4, Thus, the mobile device 500 can transmits the brief GPS data when the time T+1 reaches or after the time T+1.

The mobile device 500 is internally installed with a timer. The timer starts to count when the mobile device 500 updates the future reference point from the server and, when the shortest update time of reference point estimation $T_U$ has been expired, re-updates another new reference point from the server. Defining the shortest update time of reference point estimation $T_U$ is to prevent the mobile device 500 from moving between two reference points back and forth based on the common boundary of the two reference points, enabling the mobile device 500 to frequently update reference points from the server.

The determining module 630 determines whether the future reference point is identical to the reference point updated from the server, for example, the first reference point. If the future reference point is identical to the first reference point, the updating operation of the mobile device 500 is ignored. If the future reference point is identical to the first reference point, the selecting module 610 calculates a reference point nearest to the mobile device 500, for example, a third reference point, using the formulas (3) and (4). The comparing module 620 compares a current position of the mobile device 500 with GPS data of the reference point nearest to the mobile device 500 to calculate brief GPS data. The transmitting and receiving module 640 uploads the reference point nearest to the mobile device 500 and the brief GPS data to the server using the LoRa uploading transmission method, If the mobile device 500 has not been updated a reference point, a first reference point, for example, from the server after activated, the selecting module 610 calculates a reference point nearest to the mobile device 500, for example, a forth reference point, is calculated using the formulas (3) and (4), and the forth reference point is stored in the mobile device 500 and the server connecting to the server. The comparing module 620 compares a current position of the mobile device 500 with GPS data of the reference point nearest to the mobile device 500 to calculate brief GPS data. The transmitting and receiving module 640 uploads the brief GPS data and the reference point, with 1 byte length, nearest to the mobile device 500 to the server using the LoRa uploading transmission method.

The transmitting module and receiving 640 uploads original GPS data to the server if the mobile device 500 moves cross the movement area.

The Mobile device 500 applicable to the LoRa technology calculates displacement from the beginning time of entering the first reference point to the current time to estimate the next position of the mobile device 500, estimates the next position of the second reference point, and, when the second reference point is not identical to the first reference point, notifies the server to update the current reference point by the second reference point.

An embodiment of the method for adjusting packet length enables the packet loss rate to be reduced from 2.2% to 0%. The method for adjusting packet length can also be applied to a LoRa GPS packet with a greater packet length, such as more than 7 bytes, to substantially decrease the packet loss rate of the positioning system and improve system performance.

It is to be understood, however, that even though numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A method for adjusting packet length, executable by a mobile device, wherein the mobile device connects to a server via a network, the method comprising:

continuously collecting, by the server, Global Positioning System (GPS) data uploaded by the mobile device and analyzing the GPS data to define a movement area of the mobile device, and calculating multiple reference points which outline the movement area;

analyzing, by the server, the GPS data to obtain position distribution probabilities (DP) of each of the reference points, and selecting reference points from the multiple reference points, wherein the position distribution probability of each of the reference points is greater than a preset threshold value;

updating and setting, by the server, the reference points of the mobile device;

determining whether the mobile device has been updated at least one of the reference points from the server after activated;

determining whether a cycle of updating position information has expired if the mobile device has updated at least one of the reference points from the server after the mobile device being activated, wherein if the cycle of updating position information has expired, calculating a second reference point of the reference points nearest to the mobile device at a current time if the cycle of updating position information has expired;

comparing a current position of the mobile device at the current time with GPS data of the second reference point to obtain brief GPS data;

determining whether a third reference point of the reference points has been uploaded to the server, wherein if the third reference point has been uploaded to the server, determining whether the second reference point is identical to the third reference point, and uploading the second reference point to the server if the second reference point is not identical to the third reference point, and if the third reference point has not been uploaded to the server, uploading the second reference point to the server, and uploading the brief GPS data to the server;

wherein if the cycle of updating position information has not expired, calculating an initial position of the mobile device as the mobile device enters a range of the reference points previously calculated/established at an initial time, and the mobile device moves to a range of the reference points at the current time to estimate a future position of the mobile device;

calculating a future reference point of the mobile device according to the estimated future position; and updating the future reference point to the mobile device and the server.

2. The method for adjusting packet length of claim 1, further comprising:

not uploading the second reference point to the server if the second reference point is identical to the third reference point; and uploading the second reference point and the brief GPS data to the server via a long range technology (LoRa) uploading transmission method if the second reference point is not identical to the third reference point.

3. The method for adjusting packet length of claim 1, further comprising:

determining whether the future reference point is identical to the first reference point updated by the server;

calculating the second reference point nearest to the mobile device if the future reference point is not identical to the first reference point;

comparing a current position of the mobile device with GPS data of the second reference point nearest to the mobile device to calculate brief GPS data; and uploading the second reference point and the brief GPS data to the server.

4. The method for adjusting packet length of claim 1, further comprising:

selecting the reference point previously uploaded, if the mobile device is located at an approximately equal distance from multiple reference points of the plurality of reference points or if a saved packet length for the calculated brief GPS data of each of the multiple reference points is identical to each other.

5. The method for adjusting packet length of claim 1, further comprising:

uploading original GPS data to the server if the mobile device is moved out of the movement area.

6. A mobile device, comprising:

at least one processor;

a storage device for storing a plurality of reference points defined according to a movement area thereof and connecting to a server via a network;

one or more programs that are stored in the storage and executed by the at least one processor;

the at least one processor configured to:

upload Global Positioning System (GPS) data of the mobile device to the server, wherein the server analyzes the GPS data to define a movement area of the mobile device, calculates multiple reference points which outline the movement area, analyzes the GPS data to calculate position distribution probabilities (DP) of each of the reference points, selects reference points, from the multiple reference points, wherein the position distribution probability of each of the reference points is greater than a preset threshold value, updates and sets the reference points of the mobile device;

determine whether the mobile device has been updated at least one of the reference points from the server after activated, and determining whether a cycle of updating position information has been expired if the mobile device has been updated a first reference point of the reference points from the server after activated;

calculate a second reference point of the reference points nearest to the mobile device at a current time if the cycle of updating position information has been expired;

compare a current position of the mobile device with GPS data of the second reference point to obtain brief GPS data;

determine whether a third reference point of the reference points has been uploaded to the server, and, if the third reference point has been uploaded to the server, determine whether the second reference point is identical to the third reference point; and upload the second reference point to the server if the second reference point is not identical to the third reference point, upload the second reference point to the server if the third reference point has not been uploaded to the server, and upload the brief GPS data to the server;

wherein, if the cycle of updating position information has not expired, calculating an initial position of the mobile device as the mobile device enters a range of the reference points previously calculated/established at an initial time, and the mobile device moves to a range of the reference points at the current time to estimate a future position of the mobile device;

calculating a future reference point of the mobile device according to the estimated future position; and updating the future reference point to the mobile device and the server.

7. The mobile device of claim 6, wherein the transmitting module does not upload the second reference point to the server if the second reference point is identical to the third reference point, and uploads the second reference point and the brief GPS data to the server using a long range technology (LoRa) uploading transmission method if the second reference point is not identical to the third reference point.

8. The mobile device of claim 6, wherein the determining module determines whether the future reference point is identical to the first reference point updated by the server, calculates the second reference point nearest to the mobile device if the future reference point is not identical to the first reference point, compares a current position of the mobile device with GPS data of the second reference point nearest to the mobile device to calculate brief GPS data, and uploads the second reference point and the brief GPS data to the server.

9. The mobile device of claim 6, wherein the selecting module selects the reference point previously uploaded, if the mobile device is located at an approximately equal distance from multiple reference points of the plurality of reference points or if a saved packet length for the calculated brief GPS data of each of the multiple reference points is identical to each other.

10. The mobile device of claim 6, wherein the transmitting module uploads original GPS data to the server if the mobile device moves out of the movement area.

11. A system, comprising:

a server;

a mobile device, comprising:

at least one processor;

a storage device; and one or more programs that are stored in the storage and executed by the at least one processor; wherein the one or more programs comprising instructions for:

continuously collecting, by the server, Global Positioning System (GPS) data uploaded by the mobile device and analyzing the GPS data to ally define a movement area of the mobile device, and calculating multiple reference points of the movement area;

analyzing, by the server, the GPS data to obtain position distribution probabilities (DP) of each of the reference points, and selecting, from the multiple reference points, reference points with the position distribution probabilities greater than a preset threshold value as reference points;

updating and setting, by the server, the reference points of the mobile device;

determining whether the mobile device has been updated a reference point from the server after activated;

determining whether the cycle of updating position information has been expired if the mobile device has been updated a first reference point from the server after activated;

calculating a second reference point currently closest to the mobile device if the cycle of updating position information has been expired;

comparing a current position of the mobile device with GPS data of the second reference point to calculate brief GPS data;

determining whether a third reference point has been uploaded to the server;

determining whether the second reference point is identical to the third reference point if the third reference point has been uploaded to the server;

uploading the second reference point to the server if the second reference point is not identical to the third reference point;

uploading the second reference point to the server if the third reference point has not been uploaded to the server;

uploading the brief GPS data to the server;

if the cycle of updating position information has not been expired, calculating a position as the mobile device initially enter a range of the previous reference point at an initial time and then moves to a range of the current reference point at the current time to estimate a future position of the mobile device;

calculating a future reference point of the mobile device according to the estimated future position; and updating the future reference point to the mobile device and the server.

12. The system of claim 11, wherein the one or more programs further comprises:

not uploading the second reference point to the server if the second reference point is identical to the third reference point; and uploading the second reference point and the brief GPS data to the server via a long range technology (LoRa) uploading transmission method if the second reference point is not identical to the third reference point.

13. The system of claim 11, wherein the one or more programs further comprises:

determining whether the future reference point is identical to the first reference point updated by the server;

calculating the second reference point nearest to the mobile device if the future reference point is not identical to the first reference point;

comparing a current position of the mobile device with GPS data of the second reference point nearest to the mobile device to calculate brief GPS data; and uploading the second reference point and the brief GPS data to the server.

14. The system of claim 11, wherein the one or more programs further comprises:

selecting the reference point previously uploaded, if the mobile device is located near at an approximately equal distance from multiple reference points of the plurality of reference points or a saved packet length for the calculated brief GPS data of each of the multiple reference points is identical to each other.

15. The system of claim 11, wherein the one or more programs further comprises:

uploading original GPS data to the server if the mobile device moves out of the movement area.

* * * * *